(12) United States Patent
Esposti et al.

(10) Patent No.: US 9,681,682 B2
(45) Date of Patent: Jun. 20, 2017

(54) APPARATUS AND METHOD FOR FILLING TRAYS WITH ROD-SHAPED SMOKERS' ARTICLES

(71) Applicant: G.D S.p.A., Bologna (IT)

(72) Inventors: Marco Esposti, Casalecchio di Reno (IT); Massimo Sartoni, Bologna (IT)

(73) Assignee: G.D S.p.A., Bologna (IT)

( * ) Notice: Subject to any disclaimer, the term of this patent is extended or adjusted under 35 U.S.C. 154(b) by 75 days.

(21) Appl. No.: 14/476,419

(22) Filed: Sep. 3, 2014

(65) Prior Publication Data

US 2015/0068868 A1    Mar. 12, 2015

(30) Foreign Application Priority Data

Sep. 12, 2013   (IT) .............................. BO2013A0487

(51) Int. Cl.

| | |
|---|---|
| *B65G 37/00* | (2006.01) |
| *B65G 47/71* | (2006.01) |
| *B65B 19/12* | (2006.01) |
| *A24C 5/33* | (2006.01) |
| *A24C 5/354* | (2006.01) |

(52) U.S. Cl.
   CPC .............. *A24C 5/33* (2013.01); *A24C 5/354* (2013.01); *B65G 37/00* (2013.01)

(58) Field of Classification Search
   None
   See application file for complete search history.

(56) References Cited

U.S. PATENT DOCUMENTS

| | | | |
|---|---|---|---|
| 2,826,883 A | | 3/1958 | Pollmann |
| 3,137,110 A | | 6/1964 | Boinnard |
| 4,207,720 A | | 6/1980 | Tolasch et al. |
| 4,489,534 A | * | 12/1984 | Gomann ................ B65B 19/04 |
| | | | 221/200 |

(Continued)

FOREIGN PATENT DOCUMENTS

| | | |
|---|---|---|
| DE | 1871552 | 5/1963 |
| DE | 1432733 | 3/1969 |

(Continued)

OTHER PUBLICATIONS

European Search Report dated Feb. 11, 2015 for related European Application No. 14184038.9.

(Continued)

*Primary Examiner* — Kavel Singh
(74) *Attorney, Agent, or Firm* — Shuttleworth & Ingersoll, PLC; Timothy J. Klima

(57) ABSTRACT

An apparatus for filling trays with rod-shaped smokers articles comprises a station for filling the trays, a conveying apparatus for directing the smokers' articles in bulk to the filling station, a first conveyor assembly for directing the empty trays in succession to the filling station, and a second conveyor assembly for removing the full trays in succession from the filling station; the conveying apparatus has an outlet in communication with the filling station, and the apparatus comprises a delivery device for delivering the smokers' articles, in communication with the outlet and insertable into each tray to be filled, and a movement device for reciprocally moving the delivery device and each tray while the tray is being filled.

22 Claims, 4 Drawing Sheets

(56) References Cited

U.S. PATENT DOCUMENTS

| | | | | |
|---|---|---|---|---|
| 4,507,040 A | * | 3/1985 | Baese | A24C 5/35 |
| | | | | 131/283 |
| 4,856,958 A | * | 8/1989 | Bantien | A24C 5/356 |
| | | | | 198/347.2 |

FOREIGN PATENT DOCUMENTS

| | | |
|---|---|---|
| DE | 202005012617 | 10/2005 |
| EP | 1795076 | 6/2007 |
| FR | 1282841 | 1/1962 |
| GB | 2151218 | 7/1985 |
| GB | 2297533 | 8/1996 |
| WO | 2012/091585 | 7/2012 |

OTHER PUBLICATIONS

Italian Search Report dated Jun. 10, 2014 from counterpart app No. BO20130487.

* cited by examiner

APPARATUS AND METHOD FOR FILLING TRAYS WITH ROD-SHAPED SMOKERS' ARTICLES

This application claims priority to Italian Patent Application BO2013A000487 filed Sep. 12, 2013, the entirety of which is incorporated by reference herein.

BACKGROUND OF THE INVENTION

This invention relates to an apparatus and a method for filling trays with rod-shaped smokers' articles.

The smokers' articles that can be handled by the apparatus of this invention are, in particular, cigarettes or filters, but without this invention being considered as applicable to the handling only of these articles. For simplicity, in this description, reference is made to the handling of cigarettes and to the filling of cigarettes into containers commonly known as "trays", which are widely used in the tobacco processing industry to feed rod-shaped smokers' articles to operating machines such as cigarette packers, machines for applying filters to cigarettes or machines for making filters.

Known in the prior art are numerous apparatuses for filling trays with smokers' articles where cigarettes are conveyed in bulk from the cigarette machine to the tray filling apparatus on a horizontal conveyor belt and the cigarettes are filled into the trays by allowing the cigarettes to drop vertically into a tray below which is replaced by an empty tray when it is full.

The horizontal conveyor belt terminates at the top of a customary cigarette hopper equipped internally with agitator elements. Under the hopper there is a device, usually called "rack", consisting of two rows or combs of rotary bars having circular or square cross section, which opposes the cigarettes and allows them to drop into the underlying tray in a manner uniformly distributed across the full width of the tray itself. The rotation of the bars facilitates controlling the downward flow of the mass of cigarettes above the bars.

When just loaded, a new tray is at a raised position and therefore the rack is near the bottom of the tray. As it fills, the tray moves down continuously in such a way that the distance between the rack and the top of the mass of cigarettes inside the tray, that is to say, the drop distance of the cigarettes, remains limited and substantially constant.

At the top of the hopper there is a variable capacity buffer zone to compensate for the down time due to changing of trays and equipped with optical sensors for detecting the filling level and if necessary stopping the cigarette making machine if the maximum level is reached.

Prior art tray filling apparatuses of more recent type, in certain operating situations, allow the mass of cigarettes from the cigarette maker to flow continuously towards the infeed of a cigarette packer located downstream of the tray filling apparatuses. In such a situation, the rack remains closed and the hopper is full of cigarettes.

When the tray has to be changed, the full tray is made to withdraw on suitable rails under it and an empty one is lowered into its place just under the rack. In the meantime, the rack is closed to prevent cigarettes from dropping out.

Apparatuses of the type described above have some disadvantages.

When the rack is closed, some of the cigarettes may be "pinched", resulting in cigarettes being damaged and incorrectly positioned. These cigarettes do not move down into the underlying tray and may knock the cigarettes under them out of place or cause them to fall out onto the floor.

Furthermore, vibration and shaking as the cigarettes pass through the rack causes some of the tobacco to fall out of the cigarette ends and after passing through the rack, the cigarettes fall freely and the tray is not filled entirely uniformly even if the tray does move down slowly under the rack as filling progresses.

In the operating situation described previously where the mass of cigarettes from the cigarette maker flows continuously towards the infeed of a cigarette packing machine downstream, large numbers of cigarettes forming part of the cigarette flow in transit above the hopper roll over the cigarettes at the top of the hopper causing them to deteriorate.

Moreover, in prior art tray filling apparatuses it is not possible to exceed a certain maximum tray filling speed, which means these apparatuses cannot be associated with cigarette makers capable of producing more than 16,000 cigarettes per minute.

SUMMARY OF THE INVENTION

The aim of this invention is to provide an apparatus and a method for filling trays with smokers articles and which do not suffer from the above mentioned disadvantages inherent in prior art tray filling apparatuses.

According to the invention an apparatus and a method for filling trays with smokers' articles are provided as described in the appended claims.

BRIEF DESCRIPTION OF THE DRAWINGS

The invention is described below with reference to the accompanying drawings, which illustrate a non-limiting embodiment of it, and in which.

DESCRIPTION OF THE PREFERRED EMBODIMENTS

Figure 1:
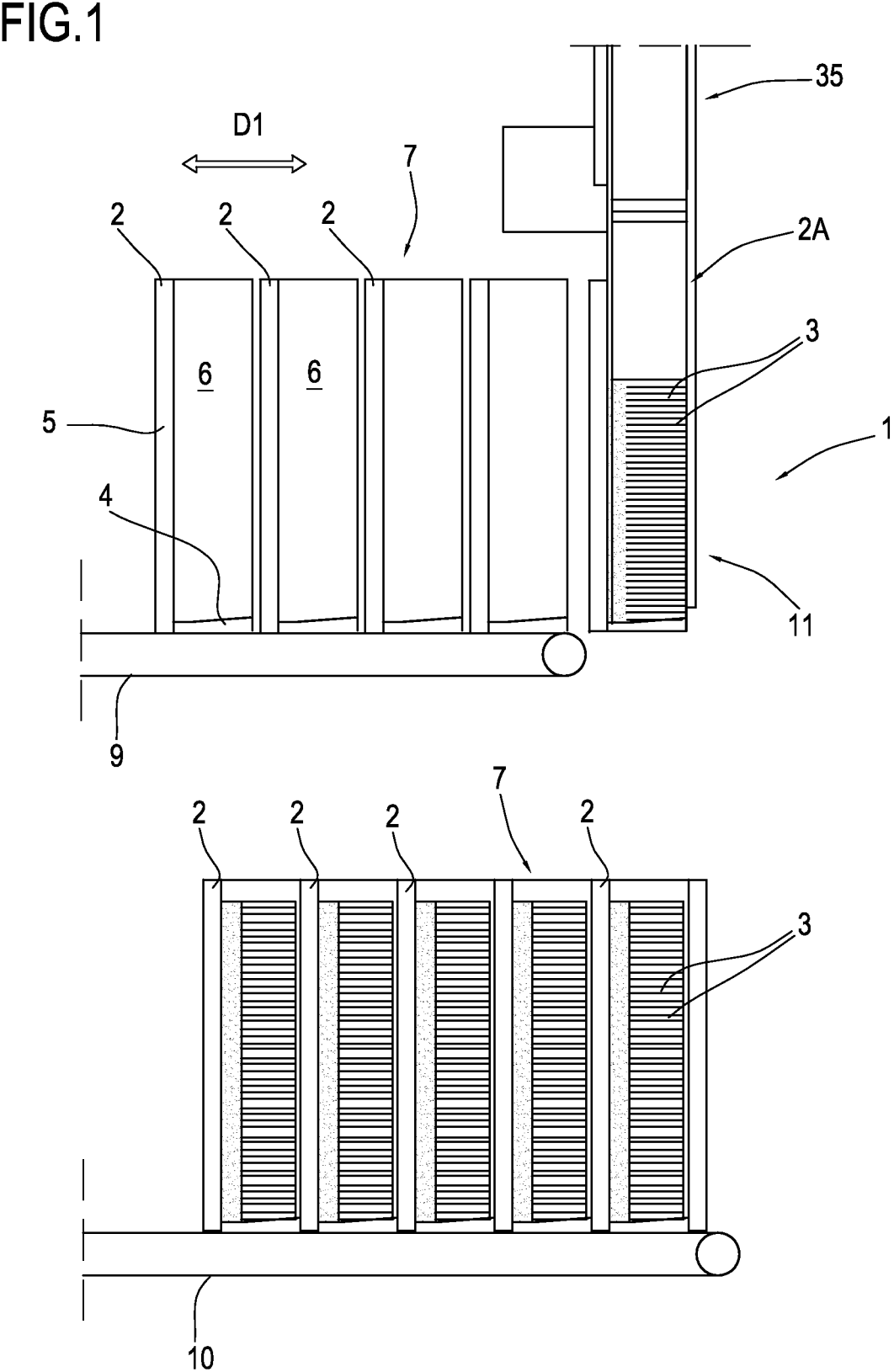
FIG. 1 is a schematic elevation view of the apparatus of the invention for filling trays with smokers' articles.

With reference in particular to FIG. 1, the numeral 1 denotes in its entirety an apparatus made according to this invention for filling trays 2 with elongate smokers' articles 3 consisting, for example, of cigarettes or filters. Hereinafter, the smokers' articles 3 will be referred to as "cigarettes" for short.

The apparatus 1 receives the cigarettes 3 fed out of a cigarette making machine (not illustrated) and arranges them in orderly fashion inside the trays 2 which are then into the hopper of a cigarette packing machine (not illustrated).

Each tray 2 is substantially in the shape of a parallelepiped and comprises a rectangular base wall 4, a main side wall 5 perpendicular to the base wall 4 and two facing side walls 6 parallel to each other and perpendicular to the base wall 4. Each tray is open on one side since it does not have a main side wall facing the wall 5 and has an upwardly open inlet mouth 7 equal in width to the 2 and a little longer in length than a cigarette 3.

The apparatus 1 comprises a frame 8 which supports in known manner two conveying apparatuses comprising substantially horizontal belt conveyors 9 and 10 placed one above the other in vertical alignment and movable in synchronism along a substantially horizontal direction D1 under the action of respective motor means not illustrated. The belt conveyor 9 is positioned above and is capable of carrying the trays 2 one at a time in sequence in essentially known manner towards a filling station 11, whilst the belt conveyor 10 is capable of removing the trays 2 one at a time in sequence in essentially known manner from the selfsame filling station 11. Each of the belts of the belt conveyors 9 and 10 are substantially equal in width to the width of a tray 2.

Figure 2:
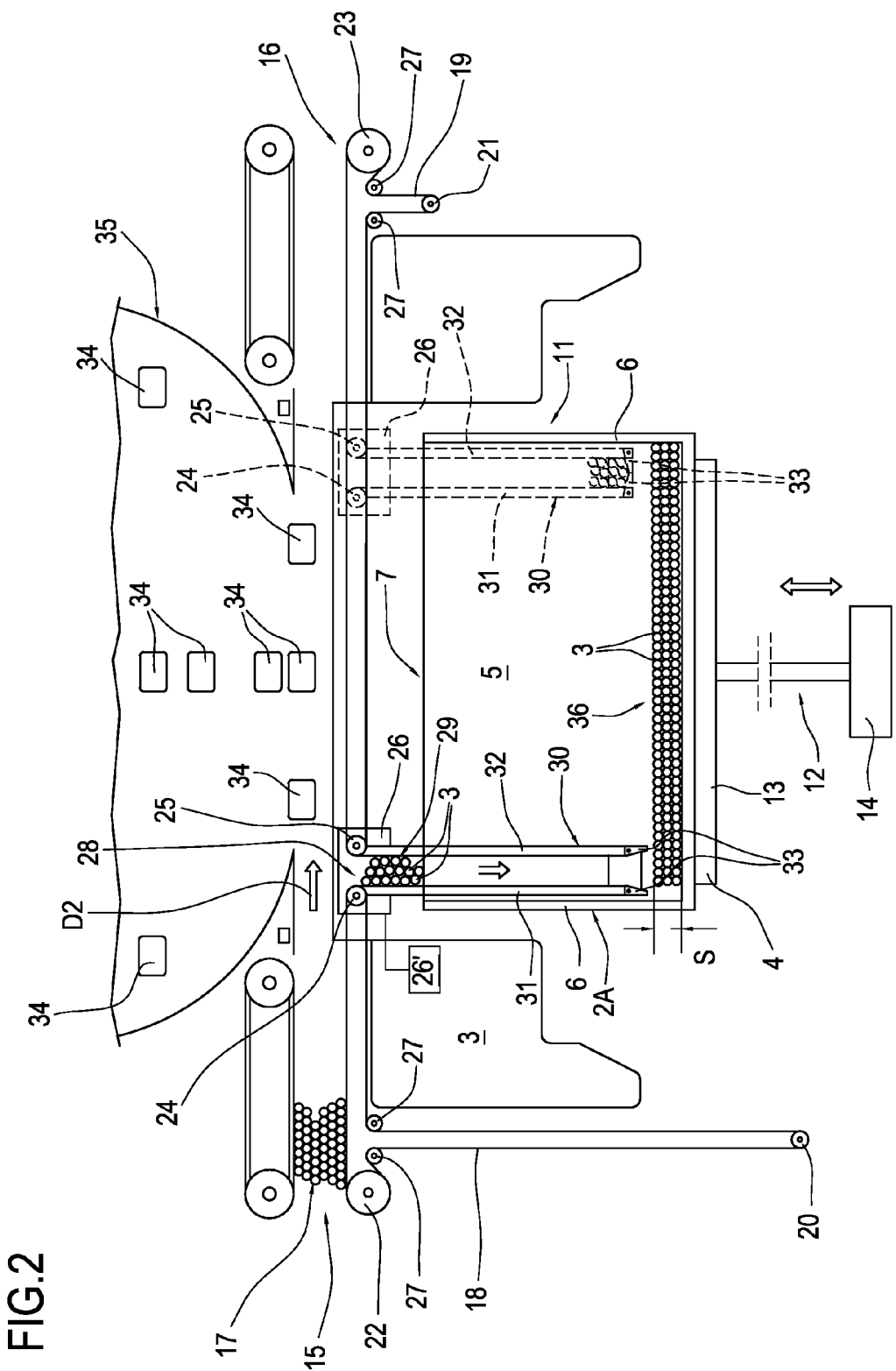
FIG. 2 is a schematic front view of a part of the apparatus of FIG. 1.

As illustrated in particular in FIG. 2, the tray 2 which is positioned at the filling station 11 is labeled 2A and is supported in use by movement means 12 which are capable of imparting intermittent vertical downward motion to it and which, in FIG. 2, are schematically represented as a supporting member comprising a horizontal supporting plate 13 which can be moved vertically in both directions by an actuating element 14.

In a different embodiment, not illustrated, the movement means 12 can impart to the tray 2 a vertical movement which follows a specific law of motion: for example, a continuous downward movement.

At the filling station 11, there are two belt conveyors 15 and 16 (on the left and on the right in FIG. 2, respectively) extending side by side horizontally and having respective horizontal co-planar upper conveying sections at a height above the level of the tray 2A.

The conveyors 15 and 16 are designed to transport a layer 17 of cigarettes 3 from the cigarette making machine and extend in a loop in a vertical plane perpendicular to the direction D1.

More specifically, as illustrated in FIG. 2, the conveyors 15 and 16 comprise a belt 18, 19, respectively, substantially equal in width to the length of a cigarette 3, and are looped around respective idler pulleys 20, 21 supported by the frame 8 with the possibility of moving translationally in a vertical direction, around respective drive pulleys 22, 23 also mounted on the frame, around respective idler pulleys 24, 25 supported by a carriage 26 which is slidably mounted on a guide (not illustrated) fixed to the frame 8 to move, as explained in more detail below, above the tray 2A along a horizontal direction D2 parallel to the bulk feed direction of the cigarettes 3 and perpendicular to the direction D1, and around other idler transmission pulleys 27. The pulleys 20, 21, 22, 23, 24, 25 and 27 are rotatable about respective axes parallel to each other and to the direction D1. Associated with the pulleys 20 and 21 are respective counterweights (not illustrated) capable of pushing them downwards constantly so as to keep under tension the conveyor belts trained around them.

The pulleys 24 and 25 forming part of the belt conveyors 15 and 16, respectively, are spaced from each other by a distance of defined length, so as to form between them a passage or outlet 28 whose length, measured in the direction D1, is preferably substantially equal to the length of a cigarette 3 and whose width, measured in the direction D2, is such as to allow the passage of a flow 29 of cigarettes 3 positioned with their respective longitudinal axes parallel to each other and to the direction D1.

Figure 3:
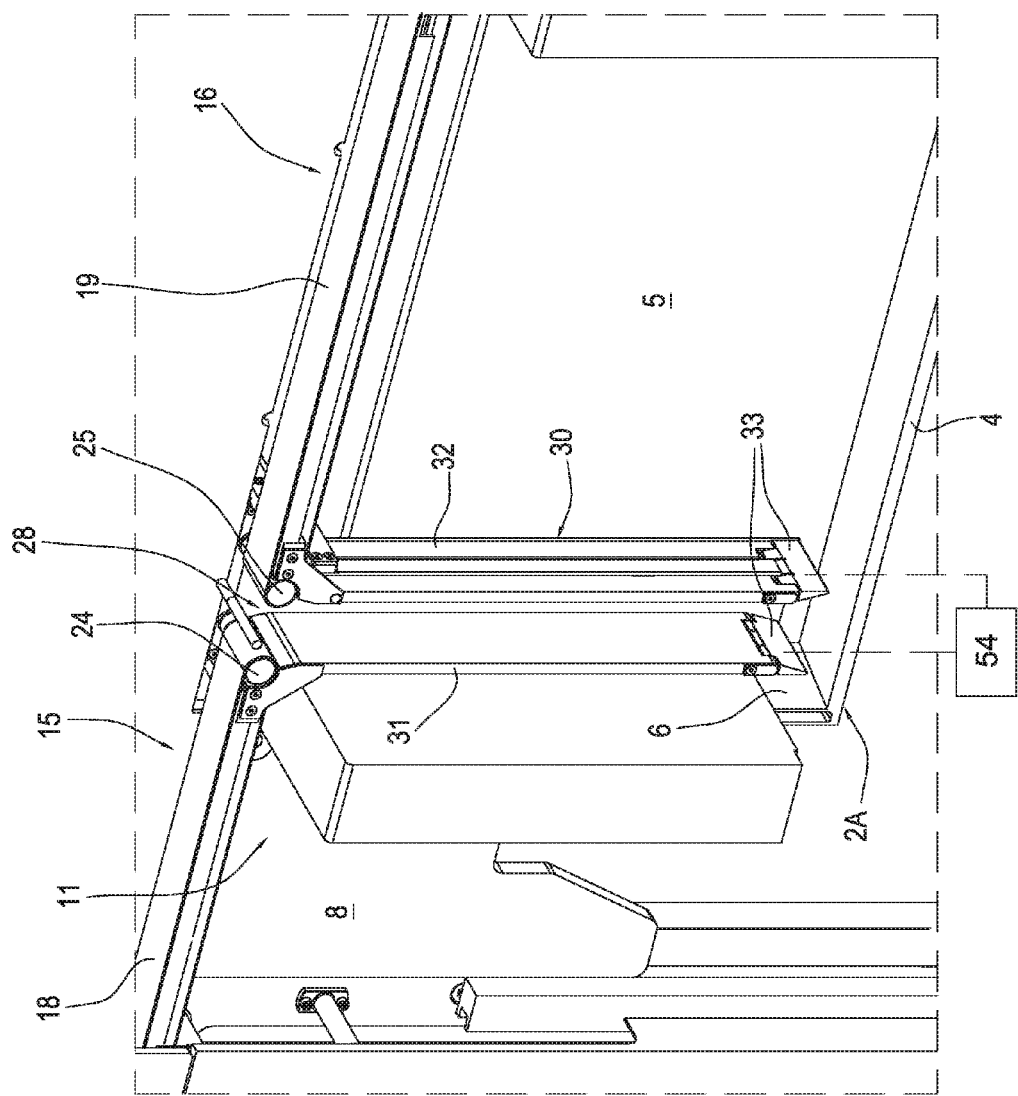
FIG. 3 is a schematic perspective view of certain details of the apparatus of FIGS. 1 and 2.

As shown in particular in FIG. 3, the carriage 26 supports at the bottom of it, just under the pulleys 24 and 25, delivery means comprising a vertical duct 30 for the transit of the flow 29 of cigarettes 3, defined on two opposite sides (on left and on the right, respectively, in FIGS. 2 and 3) by respective vertical walls 31 and 32 parallel to each other and to the direction D1. At the lower end of each of the walls 31 and 32 is hinged a movable wall or flap 33 rotatable in both directions about a respective hinge axis parallel to the direction D1 between a position where it extends downwardly and a position where it is substantially horizontal and directed towards the other movable wall 33, driven by actuating means schematically represented as a block 54.

In use, the feed speed of the belt conveyors 15 and 16 is controlled, in an essentially known manner, by the cigarette making machine and by a machine downstream of the apparatus 1, which may be a cigarette packer or a storage apparatus capable of storing cigarettes or a tray tipping apparatus.

Under conditions of equilibrium between the production of the cigarette maker and that of the machine downstream of the apparatus 1, the movable walls 33 connected to the bottom portion of the vertical duct 30 are directed towards each other and keep the bottom of the vertical duct 30 closed, the vertical duct 30 is full of cigarettes 3 which are not moving and the cigarettes 3 of the layer 17 pass by on the belt conveyors 15 and 16 on top of the cigarettes 3 in the upper portion of the vertical duct 30 itself, across the pulleys 24 and 25.

The aforementioned carriage 26 is capable, under the action of movement means schematically represented as a block 26', of moving independently of the feed speed of the conveyors 15 and 16, as a function also of the filling level, detected by photocells 34, of a variable volume hopper 35 (of essentially known type) located above the filling station 11. The hopper 35 is in communication with the top surface of the layer 17 and, if the cigarette making machine increases its production for a short length of time without there being a corresponding increase in the operating speed of the machine downstream of the apparatus 1, or if the operating speed of the machine downstream of the apparatus 1 decreases for a short length of time, it is capable of receiving inside it or delivering a variable quantity of cigarettes 3 to compensate for the temporary disequilibrium in the production of the machines involved.

When the machine downstream of the apparatus 1 stops or slows down, the apparatus 1 itself proceeds by filling the trays 2 with cigarettes 3 from the layer 17.

For this purpose, in the context of each operating cycle of the apparatus 1, an empty tray 2 is carried by the belt conveyor 9 into the filling station 11, just under the belt conveyors 15 and 16, with its inlet mouth 7 placed under the pulleys 24 and 25 and with its wall 5 directed rearwardly relative to the feed direction of the belt conveyor 9 itself. In this situation, the horizontal supporting plate 13 is at its topmost lift position, in contact with the base wall. 4 of the tray 2A situated in the filling station 11, and the vertical duct 30 is positioned inside the tray 2A itself, contiguous to one of the side walls 6 (the one on the left in the example illustrated in FIG. 2), with its movable walls 33 extending downwardly and the bottom edges thereof spaced from the base wall 4 of the tray 2A by a gap S of predetermined length.

The instant the machine downstream of the apparatus 1 stops or slows down, the belt conveyor 16 also stops or slows down, the movable walls 33 connected to the bottom portion of the vertical duct 30 are brought to their downwardly extending position and the layer 17 which is in transit above on the belt conveyor 15 enters the vertical duct 30. The cigarettes 3 present inside the vertical duct 30 then start to flow towards the base wall 4 of the tray 2A, whilst the carriage 26 is moved in such a way as to impart a horizontal translation to the vertical duct 30 towards the side wall 6 of the tray 2A opposite to that which the vertical duct 30 was initially contiguous to. During this translational movement, a layer 36 of cigarettes 3 is progressively placed on the base wall 4 of the tray 2A. The tray 2A is then lowered by the plate 13 by a length equal to the thickness of the layer 36 of cigarettes 3 and, without interruption the carriage 26 moves back and the vertical duct 30 places a second layer 36 of cigarettes in the tray 2A.

The cycle described is repeated (alternating horizontal movements of the carriage 26 in both directions and lowering of the tray 2A) until the tray 2A is full of cigarettes 3 (usually approximately 4000 cigarettes).

The final filling height is programmable and, when the specified height is reached, the movable walls 33 are rotated towards each other to close the bottom of the vertical duct 30.

The full tray 2 is then removed from the filling station 11 by the belt conveyor 10, the plate 13 is returned to its upper position and a new, empty tray 2 is carried into the filling station 11 by the belt conveyor 9 to be filled in turn in the manner described.

If the speed of the conveyor belt 19 is only reduced and not zeroed, as a result of a decrease of the operating speed of the machine downstream of the apparatus 1, the layer 17, under the control of the aforementioned photocells 34 and/or of other flow control and regulating devices of essentially known type (which operate in particular on the belt conveyor 16, on the actuating means of the carriage 26 and on the actuating means 54 associated with the movable walls 33), flows partly towards the machine itself and partly enters the vertical duct 30 to fill the trays 2 with the cigarettes 3 which the machine concerned is unable to receive.

The moment the performance of the cigarette making machine and that of the machine downstream of the apparatus 1 return to a condition of equilibrium, the belt conveyor 16 returns to its normal speed, the movable walls 33 are rotate towards each other to close the bottom of the vertical duct 30 and the layer 17 returns to flowing on the belt conveyors 15 and 16 to reach the machine downstream of the apparatus 1.

Preferably, during the time taken by the layer 17 from the machine which makes the cigarettes 3 to reach the machine downstream of the apparatus 1 because the productivities of the machines are not in equilibrium with each other, the vertical duct 30 associated with the carriage 26 may be made to move sideways at a very reduced speed, unloading a very small quantity of cigarettes 3 into the tray 2A in the filling station 11 to allow constantly changing the first layer of cigarettes 3 at the top of the column of cigarettes 3 house in the vertical duct 30 so as to prevent the cigarettes 3 of this top layer from being damaged on account of friction caused by the layer 17 in transit on top of it.

Figure 4:
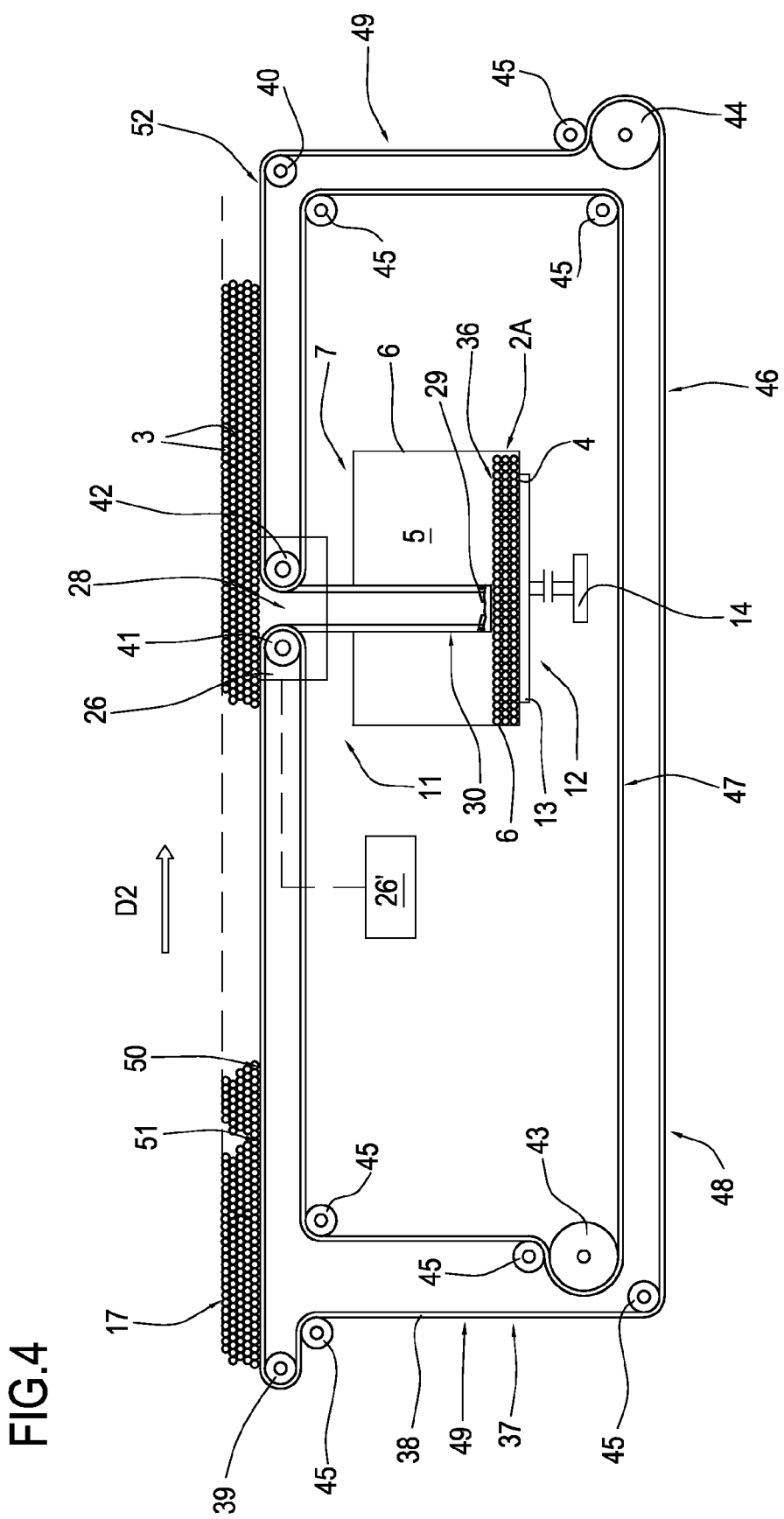
FIG. 4 schematically illustrates a variant embodiment of certain details of the apparatus of FIGS. 1-3.

In the variant embodiment of the apparatus 1 illustrated in FIG. 4, the two belt conveyors 15 and 16 are substituted for a single belt conveyor 37 where a belt 38 is looped around pulleys 39, 40, 41, 42, 43, 44, at least one of which is motor-driven, and around other idler transmission pulleys 45, in such a way as to define an outer section 46 and an inner section 47 substantially parallel to each other along an annular path open at the pulleys 41 and 42, which are supported by the aforementioned carriage 26 and which form between them the passage 28 leading into the vertical duct 30.

The open annular path defined by the outer section 46 and the inner section 47 comprises, in particular, a lower portion 48 which extends along the direction D2 and which is positioned under the tray 2A, two vertical portions 49 which extend upwards from the lower portion 48, and an upper portion 50 comprising two stretches 51 and 52 (left and right in FIG. 4, respectively) separated from each other by the passage 28, co-planar and extending along the direction D2 above the tray 2A at its topmost lifted position and at a short distance from the tray 2A itself. A tray filling apparatus using a belt conveyor the same as the conveyor 37 described above is present in patent document DE202005012617U1 which is incorporated herein by reference for completeness of description.

In use, in a manner similar to that described with reference to FIGS. 2 and 3, the carriage 26 has to be moved both ways along the direction D2 to vary the position of the passage 28 relative to the tray 2A. To produce these movements, the carriage 26 can be acted on directly by actuating means (not illustrated) associated therewith, or two of the pulleys 39, 40, 41, 42, 43, 44 associated respectively with the outer section 46 and the inner section 47 of the belt conveyor 37 may be drive pulleys which are power-driven independently of each other and which, during the translational movements of the carriage 26, may be made to rotate at different and variable speeds of rotation (with the possibility also of rotation in opposite directions by reversing the direction of rotation of one or both of the drive pulleys). As a result of the traction applied to the belt 38 by these pulleys driven (in certain operating situations) at different speeds, the carriage 26 moves translationally along the direction D2 at any desired speed and in any desired direction.

The belt conveyor 37 of FIG. 4, although in structural terms made differently from the assembly comprising the belt conveyors 15 and 16, works in functional terms in exactly the way as the conveyors 15 and 16 themselves.

It should be noted that in a further variant embodiment of this invention, not illustrated, the vertical duct 30 might be kept stationary and the tray 2A made to move translationally both ways along the direction D2 so that while the tray 2A is being filled, the position of the passage 28 relative to the tray 2A is varied for the reasons set out above. In other words, while each tray 2A is being filled, the vertical duct 30 and the tray 2A must make a movement both ways relative to each other along the direction D2.

Lastly, it should be noted that there might be no machine downstream of the apparatus 1 and that the apparatus 1 would thus be used only to fill the trays 2. In that case, the apparatus 1 would not have the components used to deliver the cigarettes 3 beyond the passage 28 along the direction D2, and all the cigarettes of the layer 17 would be made to enter the duct 30 to fill the trays 2 in the manner described above through a passage 28 at an end zone of the conveying section of the belt conveyor 15.

The apparatus 1 described fully achieves the aims set out in the introductory section of this specification.

In effect, the cigarettes 3 handled by the apparatus 1 are made to enter the tray 2A without being subjected to vibrations or other actions which might damage them, and are placed inside the tray with regular and gentle motion. Moreover, the apparatus 1 has proved to be capable of filling the trays 2 at a speed much higher than the speeds achievable by apparatuses of hitherto known type.

What is claimed is:
1. An apparatus for filling trays with rod-shaped smokers' articles, comprising:
 a station for filling the trays,
 a conveyor for directing the smokers' articles in bulk to the filling station along a horizontal path,
 a first conveyor assembly for directing empty trays in succession to the filling station, and a second conveyor assembly for removing full trays in succession from the filling station;

the conveyor having an outlet for releasing smokers' articles from the bulk to a tray located beneath the outlet, a vertical duct connected to the outlet and insertable into each tray to be filled for delivering the smokers' articles coming from the outlet, a translating carriage associated with at least one chosen from the vertical duct and the tray for reciprocally moving at least one of the vertical duct and the tray one-relative to the other of the vertical duct and the tray while the tray is being filled;

an actuator associated with the translating carriage for performing at least one movement chosen from moving the outlet and vertical duct relative to the tray and moving the tray relative to the outlet and vertical duct, while the tray is being filled, by successive movements in both directions in a horizontal direction parallel to the horizontal path along which the smokers' articles are fed in bulk.

2. The apparatus according to claim 1, wherein the conveyor comprises a first conveying section by which the smokers' articles are transported and which is connected to at least one machine for making the smokers' articles, situated upstream of the apparatus; the outlet being defined by a passage at an end zone of the selfsame first conveying section.

3. The apparatus according to claim 1, wherein the conveyor comprises a first and a second conveying section by which the smokers' articles are transported, which are located one after the other and which are connected, respectively, to at least one machine for making the smokers' articles, situated upstream of the apparatus and to an operating machine situated downstream of the apparatus; the outlet being defined by a passage between the first conveying section and the second.

4. The apparatus according to claim 3, wherein the conveyor comprises a first conveyor for directing the smokers' articles in bulk to the filling station, and a second conveyor for directing the smokers' articles in bulk from the filling station to an operating machine situated downstream of the apparatus; the first conveyor and the second conveyor defining, respectively, the first and the second conveying sections by which the smokers' articles are transported, the outlet in communication with the filling station being interposed between the first conveyor and the second conveyor and being in communication with the vertical duct at a level above the level of the trays, open at the top, located in the filling station.

5. The apparatus according to claim 4, wherein the first conveyor and the second conveyor comprise respective endless belts looped around respective pluralities of pulleys; one belt portion of each of the endless belts being looped around a respective idler pulley, and the two idler pulleys related to the two endless belts being spaced by a stretch of predetermined length; the belt portions of the endless belts defining between them the outlet in communication with the filling station, and a carriage supporting the idler pulleys and being movable, in use, while each tray is being filled, in such a way as to move the idler pulleys relative to the selfsame tray in both directions in a direction parallel to the direction in which the smokers' articles are fed in bulk.

6. The apparatus according to claim 3, wherein the conveyor comprises an endless belt looped around a plurality of pulleys rotatable about respective axes which are parallel to each other; at least one of the pulleys being a drive pulley and the belt defining a first belt portion and a second belt portion both running around respective idler pulleys which are spaced by a stretch of predetermined length, the first belt portion and the second belt portion defining between them the outlet in communication with the filling station, and a carriage supporting the idler pulleys and the vertical duct and, while each tray is being filled, being movable in both directions together with the idler pulleys in a direction parallel to the direction in which the smokers' articles are fed in bulk.

7. The apparatus according to claim 6, wherein two of the pulleys are drive pulleys; the belt defining an outer section and an inner section substantially parallel to each other along an annular path which is open at the idler pulleys to define the outlet; one of the drive pulleys being engaged with the outer section and the other with the inner section.

8. The apparatus according to claim 7, wherein the two drive pulleys are rotatable about their respective axes at respective variable speeds to move the outlet and the vertical duct along a direction perpendicular to the selfsame axes.

9. The apparatus according to claim 7, wherein at least one of the two drive pulleys is configured to reverse its direction of rotation.

10. The apparatus according to claim 1, wherein the vertical duct comprises a vertical transit duct for a flow of smokers' articles defined on two opposite sides by respective parallel walls; a movable wall being hinged to the lower end of each of the parallel walls and an actuator being provided for turning each movable wall, in use, in both directions about a respective hinge axis, between a position where the movable wall extends downwardly and a position where the movable wall is substantially horizontal and directed towards the other movable wall.

11. The apparatus according to claim 1, and further comprising a vertical movement device for reciprocally moving the tray with respect to the vertical duct while the tray is being filled, the vertical movement device comprising an actuator attached to a supporting element which supports the tray and which can be moved vertically in both directions by the actuator.

12. A method for filling trays with rod-shaped smokers' articles, comprising:

feeding the smokers' articles in bulk towards a filling station along a horizontal path via a conveyor, directing empty trays in succession towards the filling station via a first conveyor assembly, removing full trays in succession from the filling station via a second conveyor assembly;

filling the tray positioned in the filling station by allowing the smokers' articles to drop through an outlet associated with the conveyor, wherein the outlet is located above a tray when the tray is being filled;

using a vertical duct, in communication with the outlet and insertable into each tray to be filled in order to place the smokers' articles from the outlet into the tray, performing at least one movement chosen from reciprocally moving the outlet and vertical duct relative to the tray and reciprocally moving the tray relative to the outlet and vertical duct, while the tray is being filled, by successive movements in both directions in a horizontal direction parallel to the horizontal path along which the smokers' articles are fed in bulk.

13. The method according to claim 12, wherein the feeding the smokers' articles in bulk towards a filling station is accomplished by the conveyor comprising a first conveying section by which the smokers' articles are transported and which is connected to at least one machine for making the smokers' articles; the outlet being defined by a passage at an end zone of the first conveying section.

14. The method according to claim 12, wherein the feeding the smokers' articles in bulk towards a filling station is accomplished by the conveyor comprising a first and a second conveying section by which the smokers' articles are transported, which are located one after the other and which are connected to at least one machine for making the smokers' articles and to an operating machine situated downstream of the conveyor; the outlet being defined by a passage between the first conveying section and the second.

15. The method according to claim 14, wherein the feeding the smokers' articles in bulk towards a filling station is accomplished by the conveyor comprising a first conveyor for directing the smokers' articles in bulk to the filling station, and a second conveyor for directing the smokers' articles in bulk from the filling station to an operating machine situated downstream of the apparatus; the first conveyor and the second conveyor defining, respectively, the first and the second conveying sections by which the smokers' articles are transported, the outlet in communication with the filling station being interposed between the first conveyor and the second conveyor and being in communication with the vertical duct at a level above the level of the trays, open at the top, located in the filling station.

16. The method according to claim 14, wherein the feeding the smokers' articles in bulk towards a filling station is accomplished via an endless belt looped around a plurality of pulleys rotatable about respective axes which are parallel to each other; at least one of the pulleys being a drive pulley and the belt defining a first belt portion and a second belt portion both running around respective idler pulleys which are spaced by a stretch of predetermined length, the first belt portion and the second belt portion defining between them the outlet in communication with the filling station, and a carriage supporting the idler pulleys and, while each tray is being filled, being movable together with the idler pulleys in a direction parallel to the direction in which the smokers' articles are fed in bulk.

17. The method according to claim 16, wherein two of the pulleys are drive pulleys; the belt defining an outer section and an inner section substantially parallel to each other along an annular path which is open at the idler pulleys to define the outlet; one of the drive pulleys being engaged with the outer section and the other with the inner section.

18. The method according to claim 17, wherein the two drive pulleys are rotatable about their respective axes at respective variable speeds to move the outlet and the vertical duct along a direction in which the smokers' articles are fed in bulk.

19. The method according to claim 17, wherein at least one of the two drive pulleys is configured to reverse its direction of rotation.

20. The method according to claim 12, and further comprising providing that the vertical duct comprises a vertical transit duct for a flow of smokers' articles defined on two opposite sides by respective parallel walls, each of which has a movable wall hinged to its lower end; each wall being turned in both directions about a respective hinge axis, between a position where the wall extends downwardly and a position where it is substantially horizontal and directed towards the other movable wall.

21. The method according to claim 12, wherein the tray, while it is being filled at the filling station, is made to translate downwards progressively.

22. The method according to claim 12, wherein also during the simultaneously feeding the smokers' articles in bulk towards the filling station via the conveyor and towards an operating machine situated downstream of the conveyor, the vertical duct made to translate relative to the tray positioned in the filling station along a direction parallel to the direction in which the smokers' articles are fed in bulk.

* * * * *